US012770019B2

(12) United States Patent
Nair et al.

(10) Patent No.: US 12,770,019 B2
(45) **Date of Patent: *Oct. 20, 2026**

(54) AUTOMATED SYSTEM FOR AUTHENTICATION AND MONITORING USE OF AN ARTIFICIAL INTELLIGENCE ENGINE

(71) Applicant: BANK OF AMERICA CORPORATION, Charlotte, NC (US)

(72) Inventors: Sanjeev J. Nair, Plainsboro, NJ (US); Rahul Kumar Mishra, Skillman, NJ (US); Pushkar Gahlaut, Plainsboro, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1013 days.

This patent is subject to a terminal disclaimer.

(21) Appl. No.: 17/962,488

(22) Filed: Oct. 8, 2022

(65) Prior Publication Data

US 2024/0119310 A1 Apr. 11, 2024

(51) Int. Cl.
*G06F 9/451* (2018.01)
*G06N 5/02* (2023.01)

(52) U.S. Cl.
CPC ............... *G06N 5/02* (2013.01); *G06F 9/451* (2018.02)

(58) Field of Classification Search
CPC .......... G06N 5/02; G06N 20/00; G06F 9/451; G06F 21/44; H04L 9/50; H04L 9/321
See application file for complete search history.

(56) References Cited

U.S. PATENT DOCUMENTS

| | | | | |
|---|---|---|---|---|
| 8,161,458 | B2 * | 4/2012 | Johnson | G06F 11/3688 717/124 |
| 10,459,990 | B1 * | 10/2019 | Li | G06F 16/9035 |
| 10,462,172 | B1 * | 10/2019 | Sadaghiani | G06N 20/20 |
| 10,958,673 | B1 | 3/2021 | Chen et al. | |
| 11,507,540 | B1 | 11/2022 | Todd et al. | |
| 2017/0212750 | A1 * | 7/2017 | Stutzenberger | F04B 17/03 |
| 2019/0019109 | A1 | 1/2019 | Sadaghiani et al. | |
| 2019/0245680 | A1 * | 8/2019 | Boutaba | H04L 9/0637 |
| 2019/0268277 | A1 * | 8/2019 | Asthana | H04L 67/10 |

(Continued)

FOREIGN PATENT DOCUMENTS

WO 2022046312 A1 3/2022

*Primary Examiner* — Phenuel S Salomon
(74) *Attorney, Agent, or Firm* — Moore & Van Allen PLLC; Gabrielle M. Carlini

(57) ABSTRACT

Systems, computer program products, and methods are described herein for authentication and monitoring of an artificial intelligence (AI) engine. The present invention is configured to receive, from a first network device, a first set of binary data associated with an AI engine; calculate, based on the first set of binary data, an engine hash value; store the engine hash value; receive, from a second network device, an approval of the first set of binary data; update an approval status of the engine hash value; receive, from a network device associated with a final user, a second set of binary data; determine that a second hash value associated with the second set of binary data matches the engine hash value; and transmit a notification to the network device associated with the final user, wherein the notification instructs the network device to allow the final user to launch the AI engine.

17 Claims, 6 Drawing Sheets

(56) References Cited

U.S. PATENT DOCUMENTS

| | | | | |
|---|---|---|---|---|
| 2020/0007314 | A1 | 1/2020 | Vouk et al. | |
| 2020/0042313 | A1* | 2/2020 | Shafi | H04L 9/3239 |
| 2020/0044831 | A1 | 2/2020 | Soundararajan et al. | |
| 2020/0089509 | A1 | 3/2020 | Arya et al. | |
| 2020/0099513 | A1* | 3/2020 | Angelo | H04L 63/12 |
| 2020/0125739 | A1 | 4/2020 | Verma et al. | |
| 2020/0159891 | A1 | 5/2020 | Patel et al. | |
| 2020/0169408 | A1* | 5/2020 | Herrin | G06Q 40/02 |
| 2020/0193292 | A1* | 6/2020 | Weng | H04L 9/3239 |
| 2020/0244463 | A1 | 7/2020 | Wilson | |
| 2020/0265356 | A1 | 8/2020 | Lee et al. | |
| 2020/0304315 | A1 | 9/2020 | Li et al. | |
| 2020/0403805 | A1 | 12/2020 | Steele et al. | |
| 2021/0029151 | A1 | 1/2021 | Brooks | |
| 2021/0081406 | A1 | 3/2021 | Kwon et al. | |
| 2021/0133162 | A1 | 5/2021 | Richards et al. | |
| 2022/0058334 | A1 | 2/2022 | Joshi et al. | |
| 2022/0067580 | A1* | 3/2022 | Rho | G06Q 10/063 |
| 2022/0113964 | A1 | 4/2022 | Wang et al. | |
| 2022/0326973 | A1* | 10/2022 | Kottler | G06F 16/285 |
| 2023/0086015 | A1* | 3/2023 | Xiao | G07F 7/0853<br>235/380 |
| 2023/0237180 | A1* | 7/2023 | Scott | G06F 9/451<br>726/28 |
| 2023/0306139 | A1* | 9/2023 | Shah | G06F 21/602 |
| 2023/0325757 | A1* | 10/2023 | Conway | G06F 17/18<br>705/21 |

* cited by examiner

AUTOMATED SYSTEM FOR AUTHENTICATION AND MONITORING USE OF AN ARTIFICIAL INTELLIGENCE ENGINE

FIELD OF THE INVENTION

The present invention embraces a system for authentication and monitoring of an artificial intelligence (AI) engine.

BACKGROUND

In conventional AI governance systems, there are no automatic enforcement mechanisms to ensure that AI engines or models are being deployed for approved uses. As such, there is a need for a system for automatic authentication and monitoring of said AI engines and models.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for authentication and monitoring of an artificial intelligence (AI) engine is presented. The system may include at least one non-transitory storage device and at least one processor coupled to the at least one non-transitory storage device, where the at least one processor is configured to: receive, from a first network device, a first set of binary data associated with an AI engine; calculate, based on the first set of binary data, an engine hash value; store the engine hash value; receive, from a second network device, an approval of the first set of binary data; update an approval status of the engine hash value; receive, from a network device associated with a final user, a second set of binary data associated with the AI engine; determine that a second hash value associated with the second set of binary data matches the engine hash value; and transmit a notification to the network device associated with the final user, wherein the notification instructs the network device associated with the final user to allow the final user to launch the AI engine.

In some embodiments, the first network device includes a user interface. The invention is further configured to receive the first set of binary data associated with the AI engine in response to a user selection via the user interface.

In some embodiments, the network device associated with the final user is the first network device.

In some embodiments, the invention is further configured to receive the second set of binary data associated with the AI engine in response to a user selection via a user interface.

In some embodiments, the invention is further configured to automatically receive the approval of the first set of binary data in response to a data update at the second network device.

In some embodiments, the data update at the second network device includes an approval initiated by a second user.

In some embodiments, the invention is further configured to store the engine hash value on a distributed ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
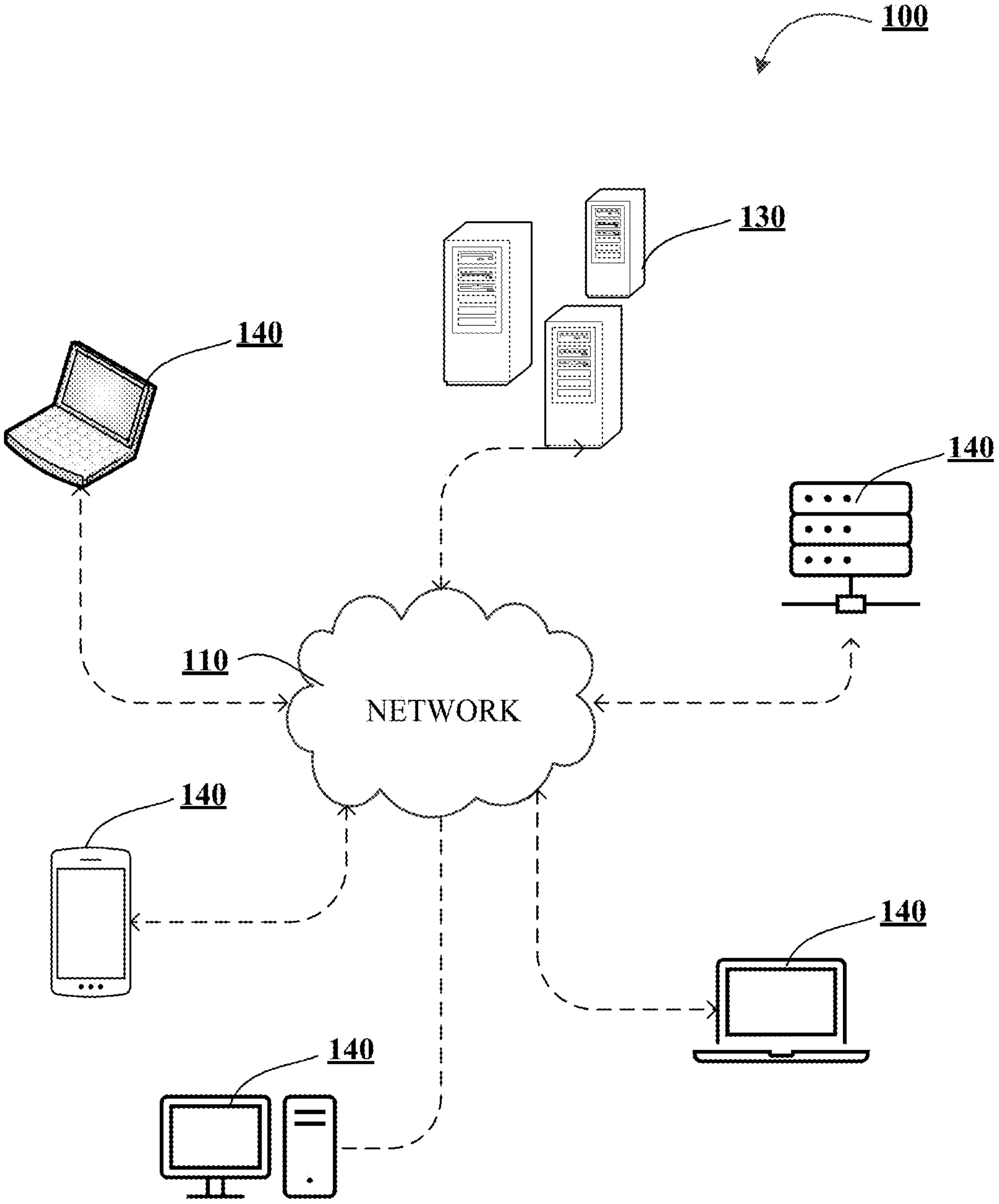
Figure 1B:
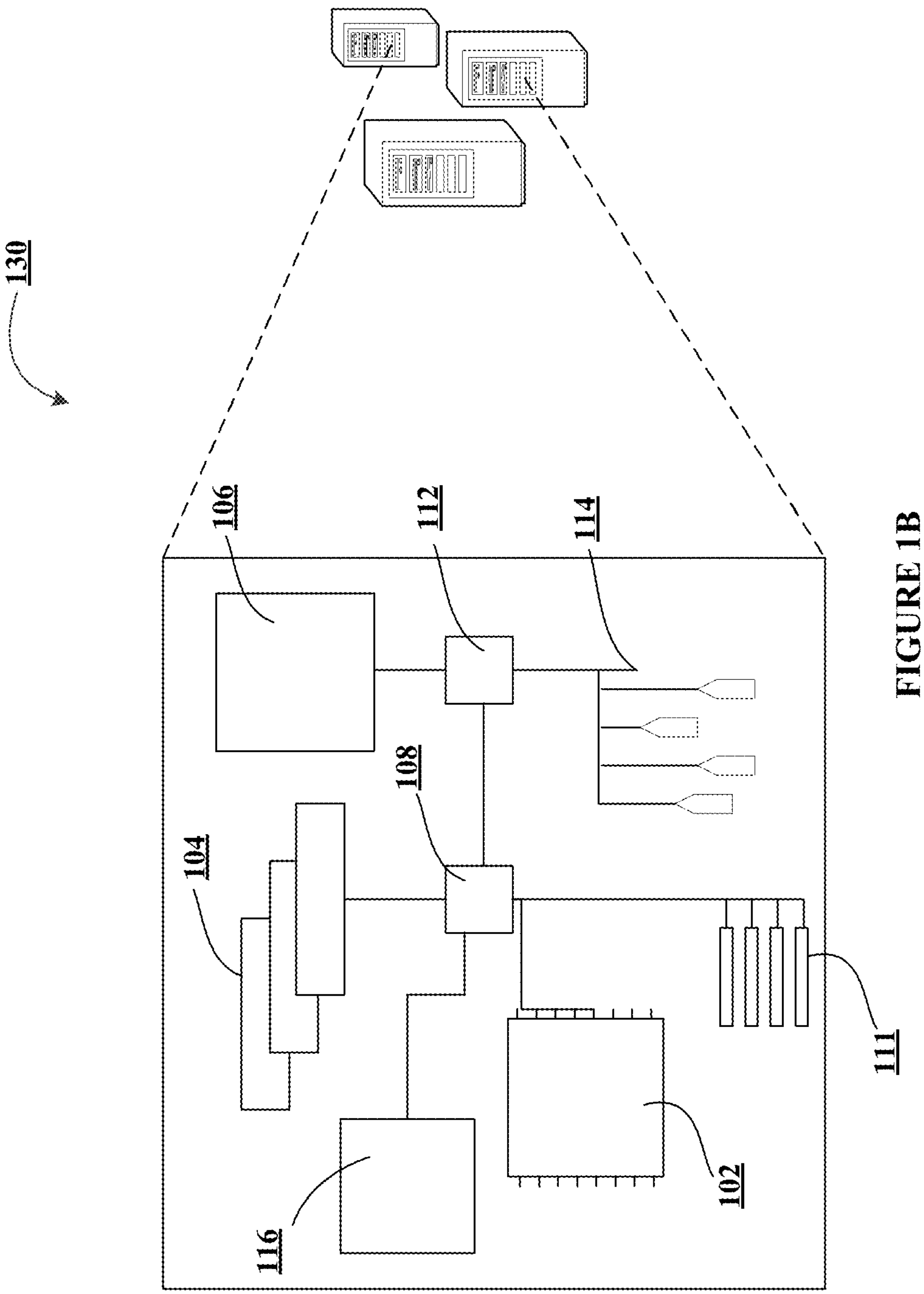
Figure 1C:
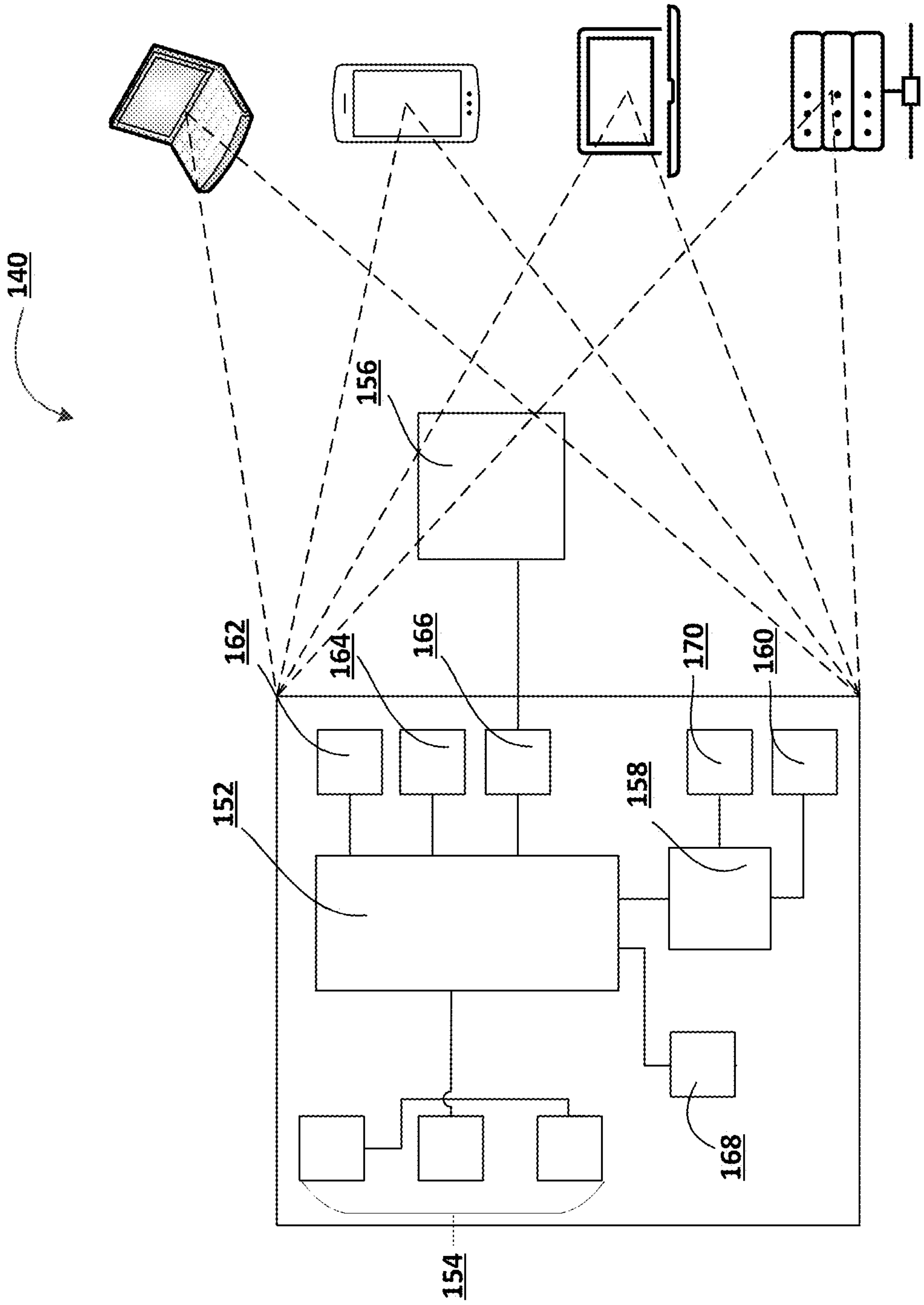
Figure 2A:
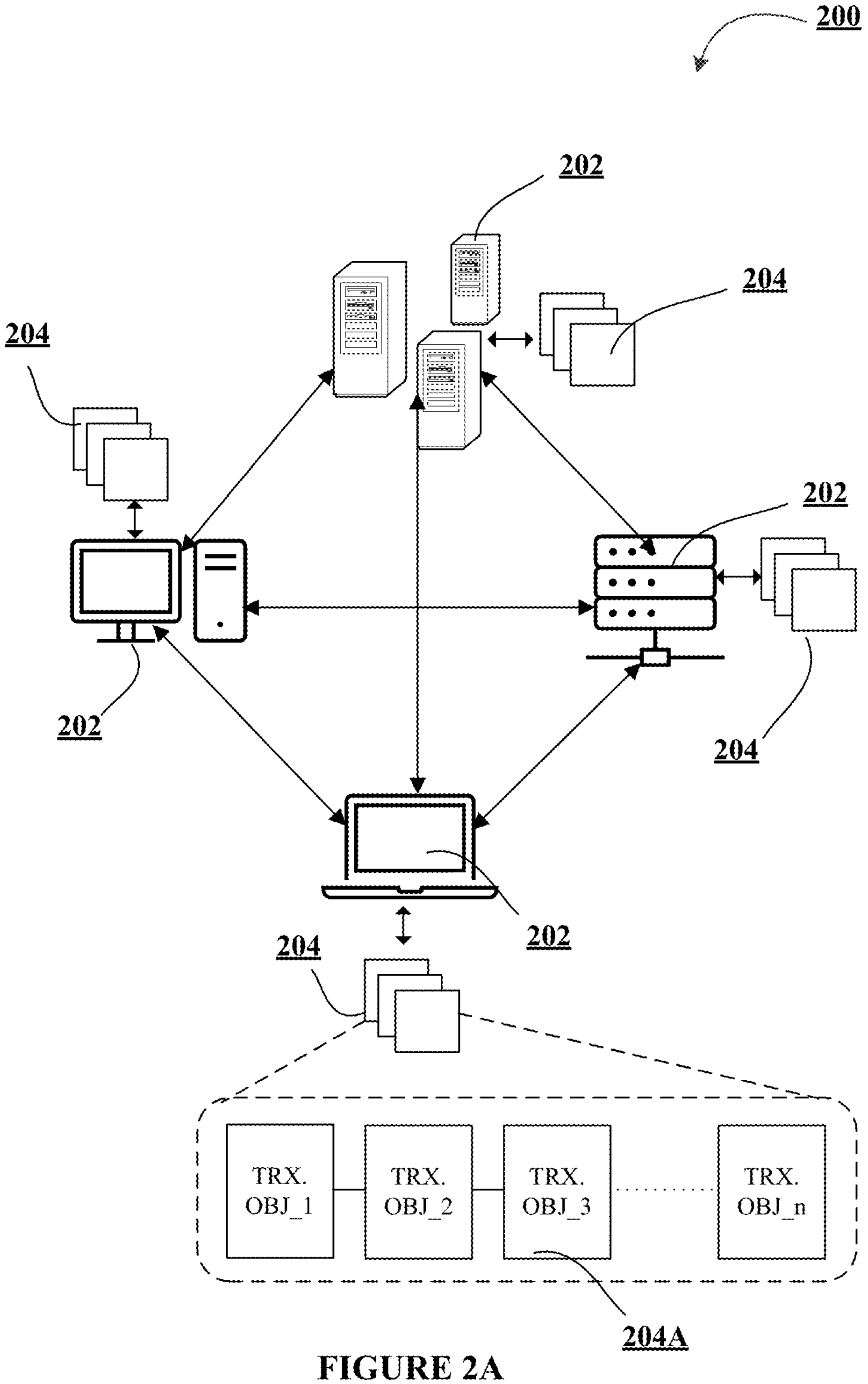
Figure 2B:
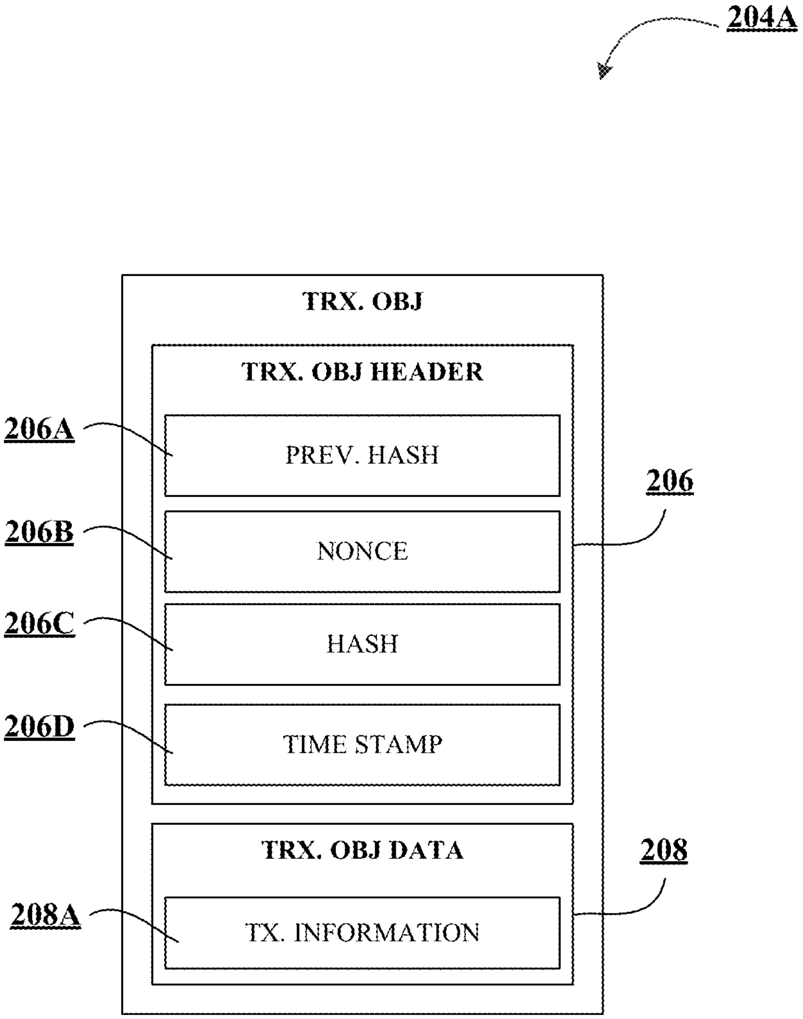
Figure 3:
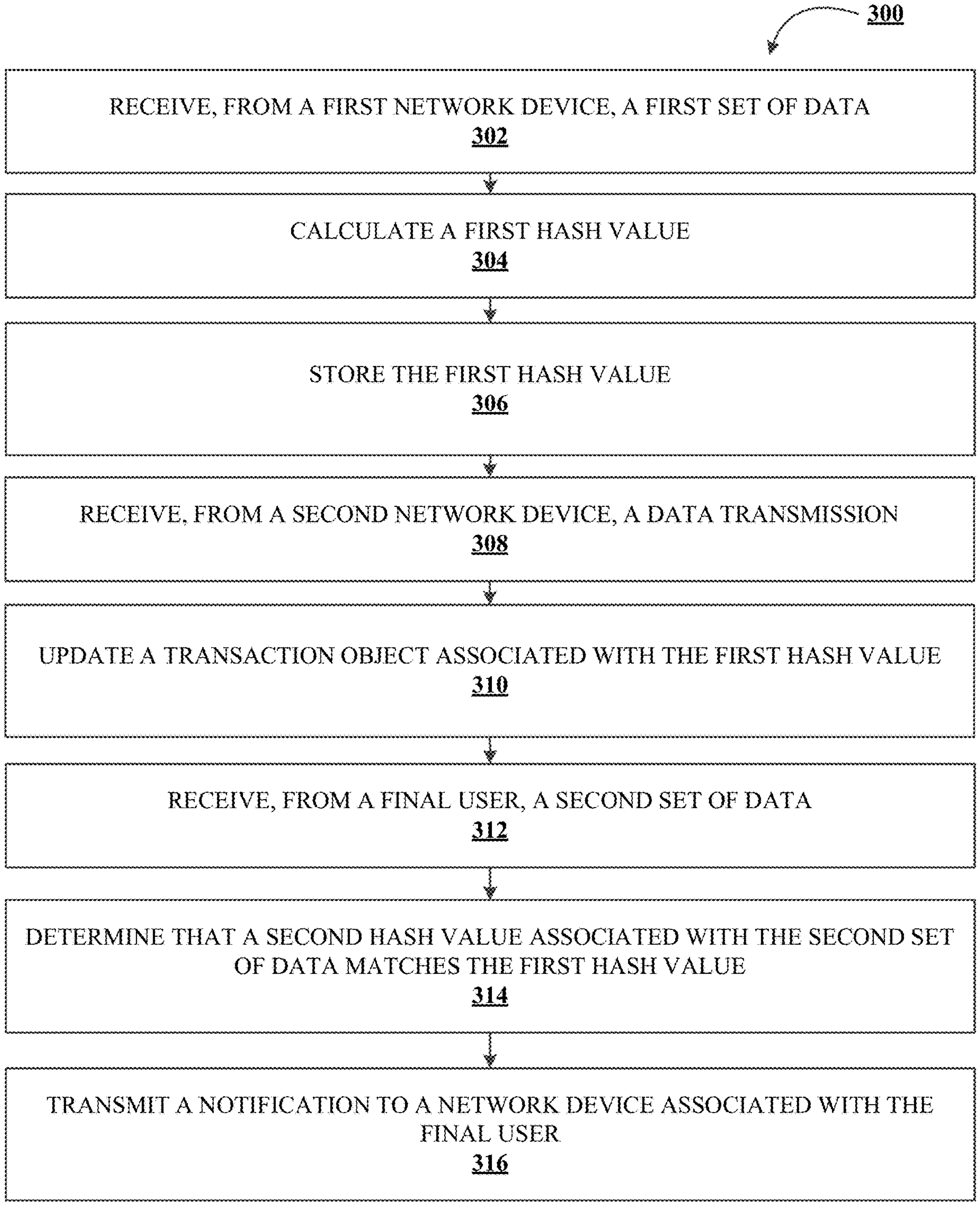

Having thus described embodiments of the invention in general terms, reference will now be made the accompanying drawings, wherein:

FIGS. 1A-1C illustrate technical components of an exemplary distributed computing environment for authentication and monitoring of an AI engine, in accordance with an embodiment of the invention;

FIGS. 2A-2B illustrate an exemplary distributed ledger technology (DLT) architecture, in accordance with an embodiment of the invention; and FIG. 3 illustrates a process flow for authentication and monitoring of an AI engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

In conventional AI governance systems, there are no automatic enforcement mechanisms to ensure that AI engines or models are being deployed for approved uses. Rather, a user such as a data scientist, analyst, or other user of an AI engine typically must certify via a user selection or digital signature that the AI engine is being used for an approved purpose. The present invention leverages distributed ledger technology to provide an automated AI governance system, by evaluating hash values associated with AI model binary code to ensure that a model has not been changed or edited since being approved by a third party user. Furthermore, the present invention allows for third party oversight of the decision making processes of an AI engine by providing a permanent data record (via a distributed ledger) of the decision parameters used by the engine as well as associated outputs. What is more, the present invention provides a technical solution to a technical problem. As described herein, the present invention is an improvement over existing AI governance solutions by (i) providing a more accurate solution to the problem, thus reducing the number of resources required to remedy any errors made due to a less accurate solution and (ii) by removing manual input and potential for human error from the implementation of the solution. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for authentication and monitoring of an AI engine 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices or network devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) or network device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port

114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) or network device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) or network device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and network device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a process flow 300 for authentication and monitoring of an AI engine, in accordance with an embodiment of the invention. The process may begin at block 302, where the system 130 may receive, from a first network device, a first set of data. In some embodiments, the first set of data may be a first set of binary data associated with an AI engine, such as the source code for a current model binary of the AI engine. The binary data may be stored in a local or cloud-based source code repository and may be accessed by a user of the first network device, such as a software developer. In some embodiments, the system may receive the binary data automatically in response to the user saving a new version of the binary data, and/or the system may receive the binary data in response to a user selection via a user interface of the first network device. Additionally or alternatively, the first set of data may comprise decision parameters associated with the AI engine such as engine inputs, training sets, weighting parameters, statistical data, mathematical factors, intermediary inputs and outputs, algorithmic functions, and/or the like.

The process flow may continue to block 304, where the system 130 calculates a first hash value associated with the first data set. In some embodiments, the system may create a transaction object associated with the first data set, including a cryptographic hash value. If the first set of data is a first set of binary data, the system may create a cryptographic engine hash value associated with the version of the AI engine encoded by the binary data. If the first set of data is a set of decision parameters, the system may create a cryptographic hash value associated with a particular instance of the AI engine being operated using said parameters. The process flow may then continue to block 306, where the system may store the transaction object and associated hash value on a distributed ledger as is discussed in greater detail with respect to FIG. 2B.

The process flow may continue to block 308, where the system receives, from a second network device, a data transmission. In some embodiments, the second network device may be a server associated with an AI model validation application. The second network device may be configured to receive a data update, such as a model binary approval, from a second user, such as a model validator. In some embodiments, the system may receive the data transmission automatically in response to the data update at the second network device, and/or the system may receive the binary data in response to a user selection via a user interface of the second network device. Additionally or alternatively, the data transmission may comprise an output of the AI engine, where the particular output of the AI engine is associated with a set of decision parameters as discussed in greater detail herein. The process flow may then continue to block 310, where the system updates the transaction object based on the data transmission. Specifically, the system may update the transaction information of the transaction object to indicate that the model binary was approved, to identify an AI output associated with particular decision parameters, and/or the like.

The process flow may then continue to block 312, where the system may receive, from the first network device or from any other network device associated with a final user, a second set of data. In some embodiments, the second set of data may be a second set of binary data associated with the AI engine, such as the source code for a new model binary of the AI engine. As discussed, the binary data may be stored in a local or cloud-based source code repository and may be accessed by a third or final user, such as a data scientist or other user of the AI engine. In some embodiments, the system may receive the second set of binary data automatically in response to the third user accessing the binary data, and/or the system may receive the binary data in response to a user selection by the third user via a user interface of the network device. Additionally or alternatively, the second set of data may comprise a second set of decision parameters associated with the AI engine such as engine inputs, training sets, weighting parameters, statistical data, mathematical factors, intermediary inputs and outputs, algorithmic functions, and/or the like.

The process flow may then continue to block 314, where the system may calculate a new cryptographic hash value associated with the second set of data. The system may then compare the new hash value to the stored hash value associated with the first set of data. Based on determining that the new hash value matches the stored hash value, the system may then proceed to block 316 and automatically transmit a notification to the network device associated with the third or final user. In some embodiments, where the first and second data sets are associated with model binary data, the notification may instruct the network device to allow the third user to launch the AI engine. In some embodiments, where the first and second data sets are associated with AI decision parameters, the notification may comprise a dataset of AI decision parameters and associated AI outputs received from the second network device. In such embodiments, the notification may be transmitted in response to a query from the first network device and/or may be transmitted based on a predetermined schedule.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent application:

| U.S. patent application Ser. No. | Title | Filed On |
|---|---|---|
| 17/962,939 | DISTRIBUTED LEDGER SYSTEM FOR SUPERVISION OF AN ARTIFICIAL INTELLIGENCE ENGINE | Oct. 10, 2022 |

What is claimed is:

1. A system for authentication and monitoring of an artificial intelligence (AI) engine, the system comprising:

at least one non-transitory storage device; and at least one processor coupled to the at least one non-transitory storage device, wherein the at least one processor is configured to:

receive, from a first network device, a first set of binary data associated with an AI engine;

calculate, based on the first set of binary data, a first engine hash value;

store the first engine hash value on a transaction object, wherein the transaction object is immutably recorded on a distributed ledger to prevent tampering with the first engine hash value;

based on receiving, from a second network device, an approval of the first set of binary data, wherein the approval is initiated by a second user associated with the second network device, update an approval status of the transaction object on the distributed ledger, wherein the approval status indicates whether the AI engine has been authorized for deployment;

receive, from a network device associated with a final user, a second set of binary data associated with the AI engine;

calculate, based on the second set of binary data, a second engine hash value;

compare the second engine hash value to the first engine hash value stored on the distributed ledger; and based on the approval status of the transaction object indicating the AI engine has been authorized for deployment and based on determining that the second engine hash value matches the first engine hash value stored on the distributed ledger, thereby verifying the integrity of the AI engine, instruct the network device associated with the final user to allow the final user to launch the AI engine, wherein the AI engine is prevented from launching if the second engine hash value does not match the first engine hash value or if the approval status does not indicate authorization for deployment.

2. The system of claim 1, wherein the first network device comprises a user interface and wherein the at least one processor is further configured to receive the first set of binary data associated with the AI engine in response to a user selection by a first user via the user interface.

3. The system of claim 1, wherein the network device associated with the final user is the first network device.

4. The system of claim 1, wherein the network device associated with the final user comprises a user interface and wherein the at least one processor is further configured to receive the second set of binary data associated with the AI engine in response to a user selection by the final user via the user interface.

5. The system of claim 1, wherein the at least one processor is further configured to automatically receive the approval of the first set of binary data in response to a data update at the second network device.

6. The system of claim 5, wherein the data update at the second network device comprises an approval initiated by a second user.

7. A computer program product for authentication and monitoring of an artificial intelligence (AI) engine, the computer program product comprising a non-transitory computer-readable medium comprising code causing an apparatus to:

receive, from a first network device, a first set of binary data associated with an AI engine;

calculate, based on the first set of binary data, a first engine hash value;

store the first engine hash value on a transaction object, wherein the transaction object is immutably recorded on a distributed ledger to prevent tampering with the first engine hash value;

based on receiving, from a second network device, an approval of the first set of binary data, wherein the approval is initiated by a second user associated with the second network device, update an approval status of the transaction object on the distributed ledger, wherein the approval status indicates whether the AI engine has been authorized for deployment;

receive, from a network device associated with a final user, a second set of binary data associated with the AI engine;

calculate, based on the second set of binary data, a second engine hash value;

compare the second engine hash value to the first engine hash value stored on the distributed ledger; and based on the approval status of the transaction object indicating the AI engine has been authorized for deployment and based on determining that the second engine hash value matches the first engine hash value stored on the distributed ledger, thereby verifying the integrity of the AI engine, instruct the network device associated with the final user to allow the final user to launch the AI engine, wherein the AI engine is prevented from launching if the second engine hash value does not match the first engine hash value or if the approval status does not indicate authorization for deployment.

8. The computer program product of claim 7, wherein the first network device comprises a user interface and wherein the apparatus is further configured to receive the first set of binary data associated with the AI engine in response to a user selection by a first user via the user interface.

9. The computer program product of claim 7, wherein the network device associated with the final user is the first network device.

10. The computer program product of claim 7, wherein the network device associated with the final user comprises a user interface and wherein the apparatus is further configured to receive the second set of binary data associated with the AI engine in response to a user selection by the final user via the user interface.

11. The computer program product of claim 7, wherein the apparatus is further configured to automatically receive the approval of the first set of binary data in response to a data update at the second network device.

12. The computer program product of claim 11, wherein the data update at the second network device comprises an approval initiated by a second user.

13. A method for authentication and monitoring of an artificial intelligence (AI) engine, the method comprising:

receiving, from a first network device, a first set of binary data associated with an AI engine;

calculating, based on the first set of binary data, a first engine hash value;

storing the first engine hash value on a transaction object, wherein the transaction object is immutably recorded on a distributed ledger to prevent tampering with the first engine hash value;

based on receiving, from a second network device, an approval of the first set of binary data, wherein the approval is initiated by a second user associated with the second network device, updating an approval status of the transaction object on the distributed ledger, wherein the approval status indicates whether the AI engine has been authorized for deployment;

receiving, from a network device associated with a final user, a second set of binary data associated with the AI engine;

calculating, based on the second set of binary data, a second engine hash value;

comparing the second engine hash value to the first engine hash value stored on the distributed ledger; and based on the approval status of the transaction object indicating the AI engine has been authorized for deployment and based on determining that the second engine hash value matches the first engine hash value stored on the distributed ledger, thereby verifying the integrity of the AI engine, instructing the network device associated with the final user to allow the final user to launch the AI engine, wherein the AI engine is prevented from launching if the second engine hash value does not match the first engine hash value or if the approval status does not indicate authorization for deployment.

14. The method of claim 13, wherein the first network device comprises a user interface and wherein the network device associated with the final user comprises a user interface, and wherein the method further comprises:

receiving the first set of binary data associated with the AI engine in response to a first user selection by a first user via the user interface; and receiving the second set of binary data associated with the AI engine in response to a second user selection by the final user via the user interface.

15. The method of claim 14, wherein the final user is allowed to launch the AI engine via the user interface.

16. The method of claim 13, the method further comprising automatically receiving the approval of the first set of binary data in response to a data update at the second network device.

17. The method of claim 16, wherein the data update at the second network device comprises an approval initiated by a second user.

* * * * *